Feb. 24, 1942. H. A. BOLLER Re. 22,030

CARBURETOR VALVE

Original Filed July 29, 1937 2 Sheets-Sheet 1

INVENTOR
Henry A. Boller.
By Donald U. Rich
ATTORNEY

Feb. 24, 1942. H. A. BOLLER Re. 22,030

CARBURETOR VALVE

Original Filed July 29, 1937 2 Sheets-Sheet 2

INVENTOR
Henry A. Boller.
BY Donald U. Rich
ATTORNEY

Reissued Feb. 24, 1942

Re. 22,030

UNITED STATES PATENT OFFICE 22,030

CARBURETOR VALVE

Henry A. Boller, Walled Lake, Mich., assignor to Carter Carburetor Corporation, St. Louis, Mo., a corporation of Delaware Original No. 2,192,703, dated March 5, 1940, Serial No. 156,338, July 29, 1937. Application for reissue July 24, 1940, Serial No. 347,309

14 Claims. (Cl. 251—125)

This invention relates to carburetors for internal combustion engines and consists particularly in novel valve control means therefor.

The choke valves in automotive carburetors frequently have been provided with resilient mountings, parts, or controls, or so-called "breather" springs so as to yieldingly resist the entry of air into the carburetor during cranking and/or the warm-up periods. Such springs have been mounted so that the tension thereof necessarily varies in accordance with the position of the valve or the control means therefor, or both. Means have also been provided for relieving back pressure within the carburetor caused, for instance, by back firing of the engine. Both of the above functions have been incorporated individually and in combination in carburetors, but the mechanisms for accomplishing the same have been relatively complicated or delicate, expensive to manufacture, and difficult to maintain in proper working condition.

An object of this invention is to provide a manual choke valve and breather spring assembly arranged so that the tension of the spring is varied only by movement of the valve relative to its control means and is substantially unaffected by movement of the valve under the influence of such control means.

Another object of the present invention is to provide a novel, simplified back fire relief choke valve for carburetors.

Another object is to provide a simple, rugged butterfly valve for a carburetor mixture conduit including means for closing the valve and means yieldingly resisting opening of the valve in either direction from the closed position.

In the present embodiment, the carburetor choke valve is resiliently mounted so as to yield bodily in either direction from its closed position under the influence of sub-atmospheric or super-atmospheric pressures in the engine intake conduit. Further, the "breather" spring is mounted to move conjointly with the choke and its manual control.

The above objects and other more detailed objects hereafter appearing are attained substantially by the structure illustrated in the accompanying drawings in which.

Figure 1:
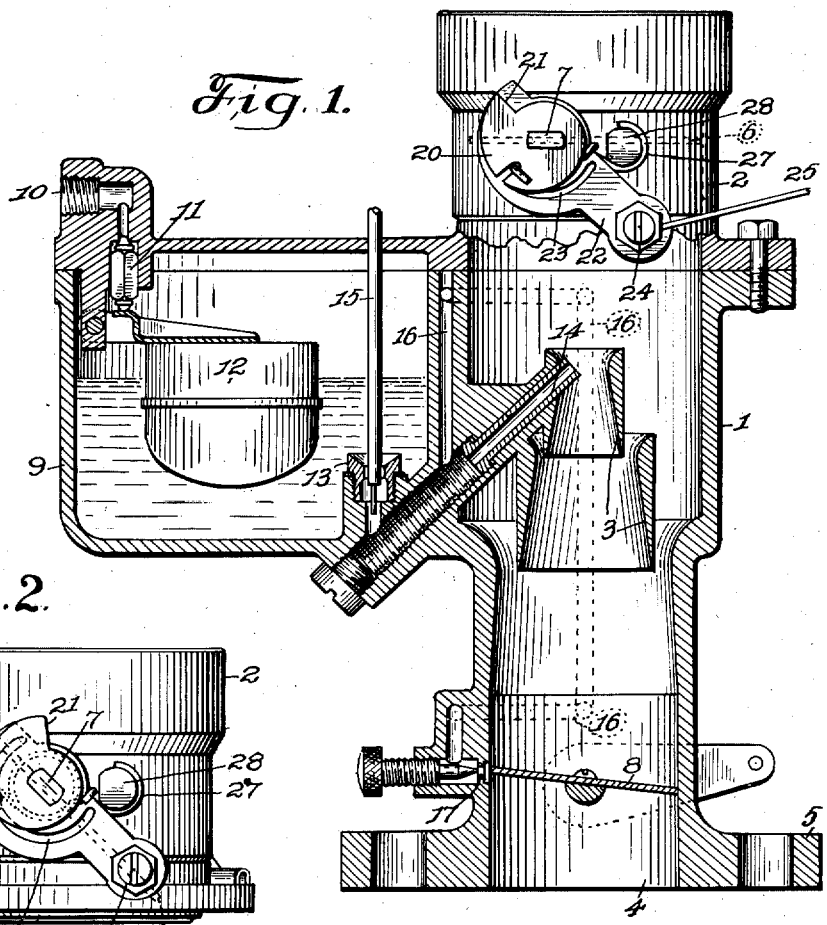
Fig. 1 is a side view of a carburetor, sectionalized in part and illustrating the invention.

The downdraft, automotive type carburetor, shown in Fig. 1, includes a mixture conduit 1 having an air inlet horn 2, multiple Venturi passages 3, and outlet portion 4 flanged as at 5 for attachment to the intake manifold (not shown) of an engine. An unbalanced butterfly-type choke valve 6 is mounted in the air horn on shaft 7 and throttle valve 8 is pivoted near the outlet portion and provided with the usual crank (not shown) for manual operation. Adjacent the mixture conduit is a bowl 9 having a threaded inlet 10, fuel in the bowl being maintained at a substantially constant level by needle valve 11 in the fuel inlet controlled by float 12.

Liquid fuel is supplied to the mixture conduit through a calibrated metering orifice member 13 and main nozzle 14 opening into the interior of the smaller venturi 3. Orifice member 13 is controlled by a stepped metering rod 15 which may be conveniently operated with the throttle valve, as is well known in the art. Fuel for idling is supplied through passages 16 to idling port 17, adjacent the edge of the throttle valve when closed. The above-mentioned structure, with the exception of choke valve mechanism, is well known in the art and in itself does not constitute the present invention.

Figure 7:
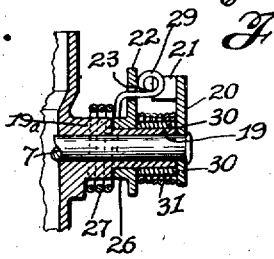
Fig. 7 is a section showing a detail of the choke control mechanism.

Choke valve shaft 7 is supported in bearing bosses 18 and 19 on the air horn and has a part at one end (Fig. 7) extending substantially beyond the body of the horn. Boss 19 extends along this part of the shaft substantially to the extremity thereof. The shaft at its outer extremity rigidly mounts a plate element 20 having an inwardly extending lip 21. Loosely mounted on boss 19 between the air horn and element 20 is a segmental arm 22 having a circular slot 23. A clamp 24 at the outer extremity of arm 22 provides for attachment of a manual control wire 25 which extends to a convenient point adjacent the driver's seat. Arm 22 includes an inwardly projecting apertured boss portion 26 abutting shoulder 19a on bearing boss 19. A coiled spring 27 mounted on the outside of boss portion 26 and shoulder 19a is hooked at one end around a stop 28 on the outside of the air horn and at its other end has a lateral finger 29 paralleling the choke shaft and extending through slot 23 in the segmental arm and normally engaging lip 21 on plate element 20.

Figure 5:
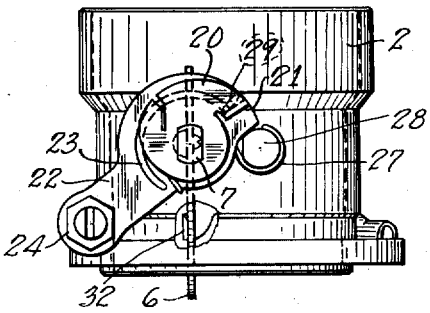
Figure 6:
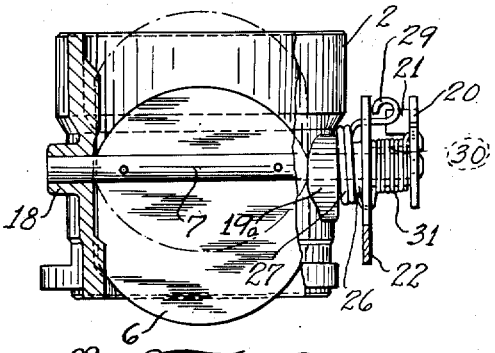
Fig. 6 is a view of the structure in Fig. 5 taken at 90° thereto, a part being sectionalized for clearer disclosure.

A tight bushing 30 surrounds boss 19 between plate element 20 and arm 22 and a coiled breather spring 31, substantially weaker than spring 27, surrounds this bushing and is connected at its ends to element 20 and arm 22. This bushing acts as a retainer to properly locate the lever 22 with respect to the shaft 7 and the member 20. Spring 31 normally resists movement of plate element 20 and valve 6 in a clockwise direction relative to arm 22. Spring 27, on the other hand, is tensioned to normally urge the segmental arm and plate element 20, through engagement of projecting finger 29 with the end of slot 23 and with lip 21, in a clockwise direction (Figs. 2–5) which, in turn, tends to move choke valve 6 to its wide open position against stop 32 on the inside of the air horn (Fig. 5).

Figure 2:
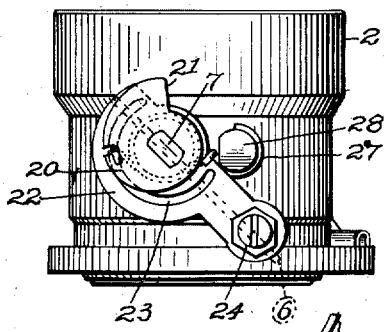
Figs. 2, 3, 4 and 5 are partial side views of the carburetor illustrating the choke valve and control mechanism in different positions.
Figure 8:
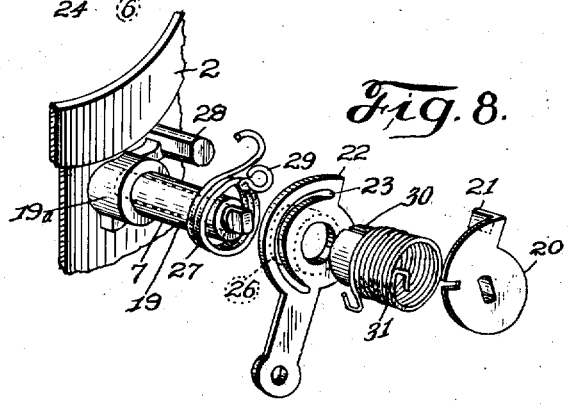
Fig. 8 is a disassembled perspective showing the choke valve mounting.

Figs. 1 and 2 show segmental arm 22 moved to its extreme position against stop 26 so as to close the choke valve for starting, as in Fig. 1. During cranking of the associated engine and during the warm up period before the choke is manually opened, valve 6 may yield in a clockwise or normal opening direction, as shown in Fig. 2, against coiled spring 31. During this operation, lip 21 on plate element 20 moves in a clockwise direction away from projecting finger 29 on spring 27, this finger and heavier spring 27 being held stationary by the segmental arm. This yielding or "breathing" action of the choke, resisted only by spring 31, continues until the segmental arm is swung to its extreme open position as shown in Fig. 5. With the choke valve against its wide open stop 32, arm 22 can move clockwise a slight additional distance so that element 32 will function as the sole effective stop for the valve. Spring 31 is preferably formed of a substantial number of coils of small gauge wire so that the tension applied thereby to the choke valve does not vary substantially as the valve is opened and closed by varying suction. This provides for fairly uniform air valve action during cranking and warm up. The effective tensioning of spring 31 is not affected by the movement of control lever 22 since this lever, the spring and disc 20 are moved jointly in the valve opening direction by spring 27 and in the closing direction by the manual control.

Figure 3:
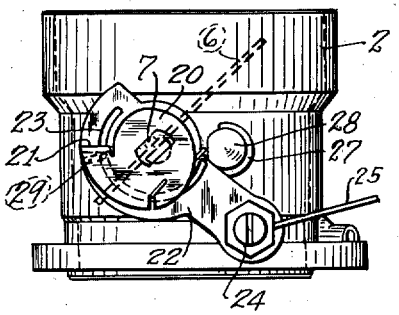
Figure 4:
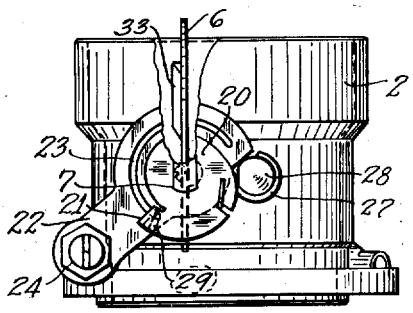

In case of an engine back fire producing superatmospheric pressure in the carburetor, the unbalanced choke valve can also yield in a counterclockwise or reverse direction, to a full open position, as shown in Fig. 3 to relieve such pressure. This function is permitted, even though the segmental arm is held stationary, due to movement of spring finger 29, under the influence of lip 21' rigid with the choke valve, in a counterclockwise direction along slot 23. Slot 23 preferably extends slightly more than 180° around shaft 7 so that the valve may yield in a counterclockwise direction fully to stop 33 near the upper edge of the air horn even when the segmental arm has been moved to its normal choke opening position, as in Fig. 4.

Although the novel yielding valve mounting is shown applied to the carburetor choke valve at the air inlet of the carburetor, it may be used with a valve otherwise positioned in the carburetor or engine intake passages. The valve may also be used wherever its function, simplicity and ruggedness may be advantageous. The back fire relief feature whereby the valve may yield bodily in a counterclockwise direction may be used exclusive of the air valve feature permitting yielding of the valve in the clockwise or normal opening direction when the manual control is moved to close the valve. Automatic or semi-automatic choke control means may be provided, if desired, instead of the manual control arrangement shown. The invention may be modified in these and other respects as will occur to those skilled in the art and the exclusive use of all such modifications as come within the scope of the appended claims is contemplated.

I claim:

1. In a carburetor, mixture conduit structure, an unbalanced, butterfly valve mounted therein and movable to a position to substantially close said conduit, the entire valve being movable in the normal opening direction from said position and in an abnormal opening direction, means for closing said valve from its normal open position, means resisting said closing movement, and means yieldingly resisting movement of said valve in said abnormal opening direction from its closed position.

2. In a carburetor, mixture conduit structure, a shaft rotatable therein, a butterfly choke valve rigid on said shaft, a control member having a one-way connection with said shaft for manual movement of said valve from its normal wide open position in the direction to close the same, a stop limiting manual movement of said member to a position corresponding to the fully closed position of said valve, said valve being movable in said direction beyond said closed position, and a spring connecting said conduit structure and said shaft for resisting movement of said valve in said direction beyond said closed position.

3. The combination of elements specified in claim 2, in which said spring is tensioned to normally maintain said valve in its wide open position.

4. The combination of elements specified in claim 2, in which the connection between said shaft and said control member includes a spring element for yieldingly resisting normal opening movement of said valve when said member is in its valve closing position.

5. In a carburetor, mixture conduit structure, a shaft rotatably mounted therein and having an abutment, an unbalanced butterfly valve on said shaft, a valve control member pivoted on said shaft and having a slot, said member being capable of movement from normal valve opening to valve closing positions, a coiled spring about said shaft and connected at one end to said structure, the other end of said spring having a projection extending through said slot and normally engaging said shaft abutment for urging said valve in the normal opening direction from its closed position, and a second spring connecting said shaft and said control member and urging said shaft in the opposite direction relative to said control member, said valve being movable in said normal opening and in said opposite directions when moved to its closed position by said control member and said second-mentioned spring resisting movement of said valve in said normal opening direction and said first-mentioned spring resisting movement of said valve in said reverse direction.

6. In combination, a coke valve shaft, a plate fixed to said shaft, an operating lever surrounding said shaft and rotatable with respect thereto, a coil spring surrounding said shaft, one end of said coil spring engaging said plate and the other end engaging said lever, a second stronger spring normally engaging said plate and opposing the action of said coil spring, said lever having an abutment for engaging said second spring and being operable to disengage it from said plate.

7. A fluid flow control mechanism for use in the air inlet conduit of a carburetor comprising a shaft adapted to be mounted transversely and eccentrically in the conduit, a valve eccentrically mounted on said shaft and adapted to be rotated by fluid pressure in either direction from a closed position in which the plane of the valve is transverse to the axis of the conduit, a weaker spring normally biasing said valve in one rotational direction, a stronger spring normally biasing said valve in the opposite rotational direction, an operating lever constructed and arranged to limit the action of said stronger spring, said operating lever being movable to a position in which the valve is held by the stronger spring in a position substantially parallel to the axis of the conduit, and said operating lever being movable to a second position in which the weaker spring is allowed to yieldably close the valve, said valve being movable away from said closed position in one direction against said weaker spring, and in the other direction against said stronger spring.

8. A fluid flow control mechanism comprising a combination air inlet and backfire valve, movable in either direction from a valve closed position, a shaft eccentrically attached to said valve, an operating lever, an air inlet spring operatively connected to normally bias said air inlet valve in one direction, a backfire spring operatively connected to normally overcome said air inlet spring and bias said valve in the opposite direction, said operating lever having an abutment for disabling said backfire spring, whereby said air inlet spring may become effective.

9. A fluid control mechanism comprising a combination air inlet and backfire valve movable in either direction from a valve closed position, a rotatable shaft eccentrically attached to said valve, a plate rigidly attached to said shaft, an operating lever, an air inlet spring operatively connected to normally bias said air inlet valve in one direction, a backfire spring operatively connected to said plate to normally overcome said air inlet spring and bias said valve in the opposite direction, said operating lever having an abutment for engaging said backfire spring and moving it out of contact with said plate by movement of said operating lever to a predetermined position, whereby said air inlet spring may become effective.

10. In a device of the class described, an air inlet conduit, an eccentrically mounted butterfly choke valve therein, the eccentric mounting for said valve comprising a shaft having one end extending outwardly from the wall of said conduit, a plate member rigidly attached to the extended end of said shaft, an operating lever mounted for rotation concentric with, but independent of said shaft between said plate member and the wall of said conduit, a relatively strong coiled spring having one end fixed with respect to said conduit and having a projection at its other end arranged to abut and urge said operating lever and said plate member from the valve closing position in the normal valve opening direction, the operative engagement of said relatively strong spring with said operating lever being such as to permit said plate member and therefore said shaft to be rotated in the opposite direction against said relatively strong spring independent of said operating lever for the purpose described, a relatively weak spring connected between said plate member and said operating lever in such manner as to resist movement of said plate member and consequently said shaft and said valve in said first-mentioned direction, a stop for limiting the rotation of said operating lever in either direction, and stops for limiting the rotation of said valve in either direction.

11. Means forming an inlet conduit, choke valve mechanism for controlling said inlet conduit comprising a transverse rotatable shaft, a plate valve rigidly attached to said shaft, an operating lever rotatably mounted with respect to said shaft, a relatively strong spring fixed with respect to said air inlet and arranged to urge said operating lever and said shaft in one rotational direction, and a comparatively light spring between said lever and said shaft and arranged to urge said shaft in an opposite rotational direction, the operative engagement of said relatively strong spring with said operating lever being such as to permit said shaft to be rotated in said opposite rotational direction independent of said operating lever against the resistance of said relatively stronger spring for the purpose described.

12. A fluid flow control mechanism comprising a conduit formed as a casting, a pair of bosses extending exteriorly from opposite sides of said conduit and being bored in alignment to journal a transverse shaft, one of said bosses being extended to journal an extension of said shaft, said extended boss having a shoulder formed thereon by a reduction in diameter at the end, a butterfly valve in said conduit and rigidly attached to said shaft, a plate member rigidly attached to the extended end of said shaft, an anchor post formed as a part of said conduit, an operating lever mounted for rotation on the reduced portion of said extended boss and adjacent said shoulder and so constructed as to be limited in its rotation in either direction due to engagement thereby of said anchor post, an operating lever retainer mounted on said extended boss between said plate member and said operating lever, a comparatively strong coil spring attached at one end to said anchor post and hving its opposite end so shaped as to contact and urge said operating lever and said plate member in one direction from the valve closing position, the operative engagement of said relatively strong spring with said operating lever being such as to permit said plate member and therefore said shaft to be rotated in the opposite direction against said relatively strong spring independent of said operating lever for the purpose described, a comparatively weak spring connected between said operating lever and said plate member and arranged to urge said plate member in said opposite direction, and stops formed within and integral with said conduit for limiting the travel in either direction of said butterfly valve.

13. In a carburetor, an air inlet, a shaft journalled in the walls thereof, an unbalanced butterfly valve mounted on said shaft, valve control means for operating said valve between its closed position and open positions in one direction from said closed position, said means comprising a member movably mounted relative to said shaft and a spring urging said shaft in the opposite direction relative to said control member, stop means limiting movement of said shaft under the influence of said spring, and stop means positioned to be engaged by said control member to stop valve closing movement thereof as said valve reaches its closed position.

14. In a carburetor, an air inlet, a shaft journalled in the walls of said inlet, an unbalanced, one-piece butterfly choke valve rigidly carried by said shaft, a control member rotatably mounted concentrically with respect to said shaft for operating said valve between its closed position and open positions in one direction from said closed position, a spring resiliently connecting said control member and said shaft and resisting movement of said valve in said direction relative to said member, cooperating stops limiting closing movement of said valve and shaft in the opposite direction relative to said member under the influence of said spring, and a stop engageable by said control member as said valve reaches its closed position whereby the tensioning of said spring is independent of the force applied to said control member.

HENRY A. BOLLER.